United States Patent
Lindskov

(10) Patent No.: US 8,666,612 B2
(45) Date of Patent: Mar. 4, 2014

(54) CONTROL UNIT FOR EARTH MOVING EQUIPMENT AND THE SIMILAR

(75) Inventor: Anders Lindskov, Broby (GB)

(73) Assignee: Leica Geosystems Technology A/S, Odense SV (DK)

( * ) Notice: Subject to any disclaimer, the term of this patent is extended or adjusted under 35 U.S.C. 154(b) by 4 days.

(21) Appl. No.: 13/595,196

(22) Filed: Aug. 27, 2012

(65) Prior Publication Data

US 2012/0323455 A1   Dec. 20, 2012

Related U.S. Application Data

(63) Continuation of application No. 12/093,490, filed as application No. PCT/DK2006/000630 on Nov. 14, 2006, now Pat. No. 8,255,125.

(30) Foreign Application Priority Data

Nov. 14, 2005   (DK) .................................. 2005 01585

(51) Int. Cl.
*G06F 19/00* (2011.01)
*G06G 7/00* (2006.01)

(52) U.S. Cl.
USPC .................................. 701/50; 701/53; 701/54

(58) Field of Classification Search
USPC .............. 701/50, 53, 54; 455/556.1; 348/725, 348/333.01
See application file for complete search history.

(56) References Cited

U.S. PATENT DOCUMENTS

| | | | | |
|---|---|---|---|---|
| 3,694,570 A | * | 9/1972 | Kotov et al. | 358/3.29 |
| 4,121,096 A | * | 10/1978 | Merezhkin | 250/202 |
| 4,776,750 A | * | 10/1988 | Griswold et al. | 414/698 |
| 5,524,368 A | * | 6/1996 | Struck et al. | 37/235 |
| 5,551,524 A | * | 9/1996 | Yamamoto et al. | 180/6.62 |
| 5,889,671 A | | 3/1999 | Autermann et al. | |
| 6,994,223 B1 | * | 2/2006 | Edgar et al. | 212/270 |
| 7,242,109 B2 | * | 7/2007 | Beeren | 307/9.1 |
| RE40,970 E | * | 11/2009 | Forster et al. | 340/572.8 |
| 2003/0151600 A1 | * | 8/2003 | Takeuchi et al. | 345/204 |
| 2005/0141897 A1 | * | 6/2005 | Takahashi et al. | 398/118 |
| 2006/0124897 A1 | * | 6/2006 | Shingai et al. | 252/299.01 |

FOREIGN PATENT DOCUMENTS

| | | |
|---|---|---|
| EP | 1291253 | 3/2003 |
| JP | 2001082010 | 3/2001 |
| WO | 0157324 | 8/2001 |

\* cited by examiner

*Primary Examiner* — Khoi Tran
*Assistant Examiner* — Jorge Peche
(74) *Attorney, Agent, or Firm* — Pearne & Gordon LLP

(57) ABSTRACT

Earth moving equipment and other heavy machinery for environmentally harsh conditions are controlled by a control panel supplied with a lock, and such panels are frequently removable to prevent theft or unauthorized operation. The interface is in the form of a plug-and-socket, the parts of which have to be sealed against dust and humidity when not interfacing. In order to prevent wear and to assure reliable control, according to the invention, no part of the connection between the control panel and a receptable is galvanic, the power supply for the control panel is wireless, such as inductive or optical, while communications may occur by means of a two-way radio protocol or by optical means.

15 Claims, 1 Drawing Sheet

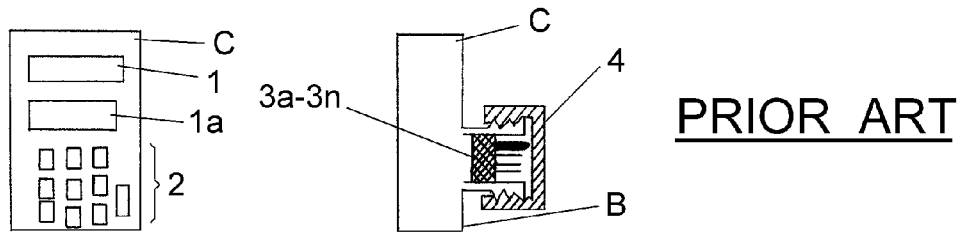
Fig. 1a  Fig. 1b  PRIOR ART
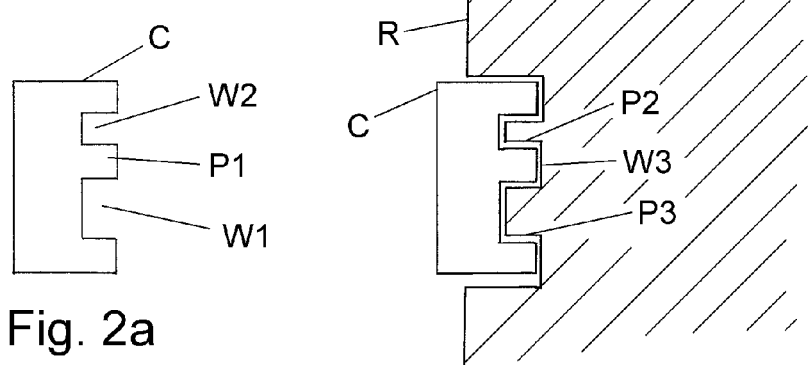
Fig. 2a  Fig. 2b
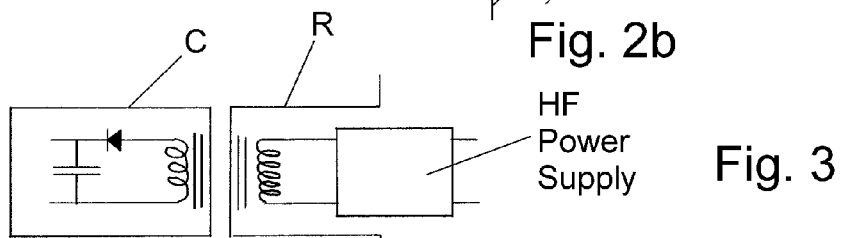
Fig. 3
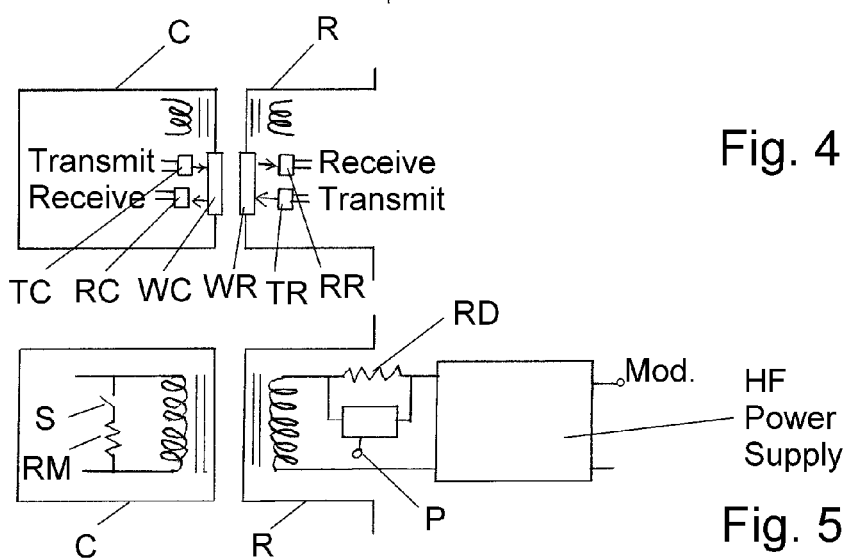
Fig. 4
Fig. 5

CONTROL UNIT FOR EARTH MOVING EQUIPMENT AND THE SIMILAR

CROSS-REFERENCES TO RELATED APPLICATIONS

This is a continuation application of application Ser. No. 12/093,490, filed Aug. 26, 2008, which is a 371 of International Application No. PCT/DK2006/000630, filed Nov. 14, 2006. application Ser. No. 12/093,490 is herein incorporated by reference in its entirety.

FIELD

The present invention relates to a control panel adapted for use on earth moving equipment and the similar to control it and to enable the visual presentation of information relating to the operation of such equipment and comprising a power supply and communication means for data. The term earth moving equipment as used in the present text is taken to comprise road building equipment and other equipment used in extremely harsh environmental conditions.

BACKGROUND

A typical control panel for earth moving equipment comprises buttons for operation by fingers and one or several displays for visual presentation of results of adjustments or measurements. Furthermore, there is frequently a physical key to be inserted into a lock to initate operations. This lock is an important safety provision, to prevent accidental use by non-professionals and to prevent theft. Such control panels have to endure very harsh conditions ranging from freezing cold, via extreme humidity to sand and dust. For these reasons, constructions are generally known where the control panel is removable and is only fitted in a cradle or receptable on the equipment when it is to be used. The electrical connections for power and data are made by means of plugs that interface with sockets that may be closed by a lid when not in use. However, it has turned out that there is considerable wear on contact parts, and in particular humidity works against reliable connections, which means that although the control panel may be kept indoors when not in actual use, it will with time still become unreliable in practical use. Some of the wear is accelerating and corrosive even though the power supply might be made by AC, due to rectification in corrosive surface layers. In particular with earth moving equipment this may have a serious influence on the safety or leave the equipment out of control in awkward positions.

SUMMARY

There is hence a desire to obtain a removable control panel that does not suffer from the above disadvantages while providing unhampered functionality for control and visual presentation. This is obtained in a construction according to the invention that is particular in that when the control panel is fitted into a receptable in said equipment, operating power for the control panel is supplied by wireless means, while data signals are exchanged between the control panel and said receptable by contactless means. In this way, several advantages are obtained: 1) the requirement for a seal against the environmental operating conditions may be fulfilled without the removal of a lid or the like, 2) both the control panel and the receptable may be thus sealed, 3) the control panel may be carried any way it is desired and may even be dropped accidentally in a pool of water, 4) the control panel may assume the role of a key that locks the earth moving equipment when not in use.

In one embodiment of the invention the operating power is transmitted inductively by a transmitting coil in a receptable for the control panel to a receiving coil inside the control panel.

In another embodiment of the invention the operating power is transmitted by light radiation from a source or sources in the receptable to converters from light energy to electric energy in the control panel.

In an advantageous embodiment of the invention the contactless communication is a two-way communication using optical means for at least one direction of communication. In practice, the communication is shielded from ambient light by suitable cooperation between elements on the control panel and the receptable, respectively. A line of light emitting diodes (LEDs) may be fitted in bottom or the sides of the receptable and corresponding sensors may be lined up in the bottom or on the sides of the control panel. The optical windows for the communication may be of such a dimension that they may be simply wiped clean when needed before fitting the control panel into the receptable.

In a further advantageous embodiment of the contactless communication is a wireless two-way communication using inductive means for at least one direction of communication. In this case there is no need to wipe any part before obtaining efficient communication.

In further advantageous embodiments of the invention at least one direction of the two-way communication occurs by frequency-shift-keyed signals.

In a further advantageous embodiment of the invention the wireless two-way communication occurs via a two-way radio communication protocol, such as Bluetooth™.

In a further advantageous embodiment of the invention one direction of the two-way communication occurs by superimposing communication signals on the light flux from the light source or sources in the receptable for suitable demodulation means provided in the control panel. This may constitute a particularly robust form of communication, because a line of high power light emitting diodes (LEDs) may be disposed in the receptable, in order to provide the power for the operation of the control panel, and the coding of the light flux may occur by extinguishing some of the LEDs according to a time pattern in a pre-defined communications protocol.

In a further advantageous embodiment of the invention the wireless two-way communication occurs by modulating the power supply current in the transmitting coil in the receptable for one direction of communication and by modulating the load impedance of the receiving coil for the opposite direction of communication. This completely obviates any need for a dedicated interface on the control panel and the receptable for the exchange of information.

In a further advantageous embodiment of the invention one direction of the contactless communication occurs during the activation of a pushbutton fitted in the control panel, in which the pushbutton mechanically controls a magnet that is brought in proximity to a reed switch in the receptable in order to change its state under the direct influence of the pushbutton. Such pushbuttons set in a keypad would simply consist of spring-biased pushrods having magnets at the other end and require no electrical connection in the control panel for this type of data input by the operator.

BRIEF DESCRIPTION OF THE DRAWINGS

The invention will be described in greater detail in the following with reference to the drawings, in which FIG. 1 shows a control panel according to prior art, front and side view, FIG. 2 shows a control panel according to the invention outside of and in the corresponding receptable, FIG. 3 shows a block schematic for one embodiment of the invention, FIG. 4 shows a block schematic for a second embodiment of the invention, and FIG. 5 shows a block schematic for a third embodiment of the invention.

DETAILED DESCRIPTION

In FIG. 1a is shown a typical prior art control panel C presenting two readout units 1, 1a and ten buttons generally indicated at 2. These elements comprise the input to the operator and the output of certain instructions to sensors on the earth moving equipment which may furthermore be controlled by ordinary handles and levers that are not shown. FIG. 1b shows the same control panel from the side, and it is seen that a complex plug 3a-3n is provided at the backside of the control panel, said plug having a screwed-on lid 4 that has to be removed before the plug is fitted into a socket mounted on the earth-moving equipment. A corresponding lid is provided for the socket.

FIG. 2a shows a side view of a control panel according to the invention, and it is seen that the backside does not have any plug as such, but projections and wells that cooperate with the receptable R as shown in FIG. 2b. Projection P2 fits into well W2, projection P1 fits into well W3, and projection P3 fits into well W1. Both parts of the equipment are completely sealed, and there is no galvanic connection between them.

In FIG. 3 is shown how the power is transmitted from the receptable R to the control panel C by inductive means. An inductive transmitter coil is supplied via a high frequency power supply; supersonic frequencies are preferred, but the choice of an operating frequency and waveform will be guided by considerations of electromagnetic interference (EMI), load, and bulk. The coils may be placed below the surfaces of well W1 and projection P3, respectively. A sketch of a self-explanatory circuit diagram is shown for obtaining a DC power supply in the control panel C. It is not envisaged that there is a requirement for a battery to be charged in the control panel.

In FIG. 4 is shown the principle of optical two-way transmission of data, in that at least two windows WC in the control panel and WR in the receptable face each other. These windows may be set in the bottom of well W2 of the control panel and at the top of projection P2 in the receptable. Behind these sealed-in windows a transmitting light source TC is transmitting to an optical receiver RR in the receptable, and, according to the protocol used, a transmitting light source TR in the receptable R is transmitting to an optical receiver RC in the control panel C. The inductive power supply is shown as coils and core parts only.

In FIG. 5 is shown how the high frequency supply may be used for transmitting and receiving information, thus obviating the need for optical transmitters. For transmitting from the receptable, the HF voltage may be modulated and be received and detected in the control panel. For transmitting from the control panel, the HF voltage may be held constant in the receptable R, and the load on the receiving coil in the control panel may be varied. This is schematically shown as a switch S that connects and disconnects a load resistor RM across the receiving coil. Due to the tight coupling between the transmitting and receiving coils, such a change in load may be detected as a change in the current drawn from the HF power supply, as shown by a series resistor RD and a voltage detector with an output of a "remote" signal P. A suitable protocol for serial two-way communication may be established in this manner. Both the receptable and the control panel acccording to this embodiment of the invention may be simply hosed down to clean them of debris before fitting the control panel into the receptable in order to make the earth moving equipment operational.

In the above embodiments, in order that the power may be supplied from the receptable from the time that the control panel C is inserted into the cradle or receptable R, such power may be activated by means of a reed switch in the receptable when acted upon by a magnet appropriately placed on the control panel.

It should be noted that in the embodiments above, bi-directional communication has been described in connection with specific technologies. There is, however, no reason why it would not be possible to mix the technologies according the needs in any one construction. The precise choice of technology will be made by the skilled person using the embodiments described above as instructive examples.

The foregoing description of the specific embodiments will so fully reveal the general nature of the present invention that others skilled in the art can, by applying current knowledge, readily modify or adapt for various applications such specific embodiments without undue experimentation and without departing from the generic concept, and therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of forms without departing from the invention.

Thus, the expressions "means to . . . " and "means for . . . ", or any method step language, as may be found in the specification above and/or in the claims below, followed by a functional statement, are intended to define and cover whatever structural, physical, chemical, or electrical element or structure, or whatever method step, which may now or in the future exist which carries out the recited functions, whether or not precisely equivalent to the embodiment or embodiments disclosed in the specification above, i.e., other means or steps for carrying out the same function can be used; and it is intended that such expressions be given their broadest interpretation.

The invention claimed is:

1. A control panel adapted to be removed from a receptable of earth moving equipment to lock the earth moving equipment from being used, wherein the control panel is a key for locking and unlocking the earth moving equipment, and wherein the control panel is further configured to be fitted with the receptable to unlock the earth moving equipment such that the control panel is additionally configured to control the earth moving equipment and to enable the visual presentation of information relating to the operation of the earth moving equipment, the control panel comprising a power supply and communication means for data wherein, when the control panel is fitted into a receptable in the earth moving equipment, operating power for the control panel is supplied by wireless means, while data signals are exchanged between the control panel and the receptable by contactless means.

2. The control panel according to claim 1, wherein the operating power is transmitted inductively by a transmitting coil in the receptable for the control panel to a receiving coil inside the control panel.

3. The control panel according to claim 1, wherein the operating power is transmitted by light radiation from a source or sources in the receptable to converters from light energy to electric energy in the control panel.

4. The control panel according to claim 1, wherein the contactless communication is a two-way communication using optical means for at least one direction of communication.

5. The control panel according to claim 4, wherein at least one direction of the two-way communication occurs by frequency-shift-keyed signals.

6. The control panel according to claim 4, wherein one direction of the two-way communication occurs by superimposing communication signals on the light flux from the light source or sources in the receptable and that suitable demodulation means are provided in the control panel.

7. The control panel according to claim 1, wherein the contactless communication is a wireless two-way communication using inductive means for at least one direction of communication.

8. The control panel according to claim 7, wherein at least one direction of the two-way communication occurs by frequency-shift-keyed signals.

9. The control panel according to claim 7, wherein the wireless two-way communication occurs via a two-way radio communication protocol, such as Bluetooth (™).

10. The control panel according to claim 1, wherein one direction of the contactless communication occurs by the operation of a pushbutton fitted in the control panel, in which the pushbutton mechanically controls a magnet that is brought in proximity to a reed switch in the receptable in order to change its state under the direct influence of the pushbutton.

11. The control panel according to claim 1, further comprising a plurality of projections configured to be received within a plurality of wells within the receptable when the control panel is fitted to the receptable.

12. A control panel configured to be selectively fitted with a receptable of earth moving equipment, the control panel comprising:

a power supply configured to wirelessly receive operating power from the receptable when the control panel is fitted with the receptable; and a contactless communication device configured to exchange data signals between the control panel and the receptable when the control panel is fitted with the receptable, wherein the control panel is a key for locking and unlocking the earth moving equipment, and is configured to unlock the earth moving equipment when fitted with the receptable to additionally allow operation of the earth moving equipment with the control panel and wherein the control panel is further configured to lock the earth moving equipment when the control panel is not fitted with the receptable to prevent operation of the earth moving equipment.

13. The control panel according to claim 12, further comprising a plurality of projections configured to be received within a plurality of wells within the receptable when the control panel is fitted to the receptable.

14. A combination comprising:

a receptable of earth moving equipment; and a control panel configured to be selectively fitted with the receptable, the control panel comprising a power supply configured to wirelessly receive operating power from the receptable when the control panel is fitted with the receptable and a contactless communication device configured to exchange data signals between the control panel and the receptable when the control panel is fitted with the receptable, wherein the control panel is a key for locking and unlocking the earth moving equipment, and is configured to unlock the earth moving equipment when fitted with the receptable to additionally allow operation of the earth moving equipment with the control panel and wherein the control panel is further configured to lock the earth moving equipment when the control panel is not fitted with the receptable to prevent operation of the earth moving equipment.

15. The combination according to claim 14, wherein the control panel comprises a plurality of projections configured to be received within a plurality of wells within the receptable when the control panel is fitted to the receptable.

* * * * *